United States Patent [19]

Ostrowicki et al.

[11] Patent Number: 5,910,534
[45] Date of Patent: Jun. 8, 1999

[54] STABLE, AQUEOUS DISPERSIONS OF COPOLYMERS BASED ON CONJUGATED, ALIPHATIC DIENES AND VINYL AROMATIC COMPOUNDS

[75] Inventors: Andreas Ostrowicki, Köln, Germany; Joachim Waldi, Ontario, Canada; Dennis-Wayne Jones, Langenfeld, Germany

[73] Assignee: Bayer Aktiengesellschaft, Germany

[21] Appl. No.: 08/889,644

[22] Filed: Jul. 8, 1997

[30] Foreign Application Priority Data

Jul. 15, 1996 [DE] Germany ............... 196 28 446

[51] Int. Cl.$^6$ ...................................... C08L 9/08
[52] U.S. Cl. ............................................. 524/575
[58] Field of Search ................................. 524/575

[56] References Cited

U.S. PATENT DOCUMENTS

| | | | |
|---|---|---|---|
| 3,329,640 | 7/1967 | Scotti et al. | 260/29.6 |
| 3,872,037 | 3/1975 | MacLeod | 524/33 |
| 4,064,080 | 12/1977 | Daniel | 524/575 |
| 4,086,199 | 4/1978 | Daniel | 524/828 |
| 4,445,959 | 5/1984 | Hombach | 524/750 |
| 4,474,919 | 10/1984 | Lobar | 524/377 |
| 4,559,374 | 12/1985 | Senyek | 524/458 |
| 5,191,008 | 3/1993 | Frost | 524/458 |
| 5,200,459 | 4/1993 | Weih | 524/503 |
| 5,252,128 | 10/1993 | Gopalkrishnan | 106/724 |
| 5,348,993 | 9/1994 | Daeumer et al. | 524/44 |

FOREIGN PATENT DOCUMENTS

| | | |
|---|---|---|
| 1 484 841 | 9/1977 | United Kingdom . |
| 1 484 854 | 9/1977 | United Kingdom . |

*Primary Examiner*—Paul R. Michl
*Attorney, Agent, or Firm*—Connolly and Hutz

[57] ABSTRACT

Stable, aqueous dispersions of copolymers based on conjugated, aliphatic dienes and vinyl aromatic compounds are prepared by carrying out the emulsion polymerisation in the presence of water and emulsifiers and in the presence of water-soluble initiators, with 15 to 85 wt. % of the total of the emulsifiers used being added within the time in which up to 40% of the overall conversion of the components used is attained, and with 1 to 50% of the carboxylic acid groups contained in the additionally used ethylenically unsaturated carboxylic acids being neutralized by the addition of bases during the emulsion polymerisation.

7 Claims, No Drawings

STABLE, AQUEOUS DISPERSIONS OF COPOLYMERS BASED ON CONJUGATED, ALIPHATIC DIENES AND VINYL AROMATIC COMPOUNDS

The present invention relates to stable, aqueous dispersions of copolymers based on conjugated, aliphatic dienes and vinyl aromatic compounds and to the use thereof as binders for the coating of paper.

Aqueous dispersions of copolymers based on conjugated, aliphatic dienes and vinyl aromatic compounds are known (see, for example, DE-A 26 02 445, DE-A 26 02 444, U.S. Pat. No. 3,575,913). The aqueous polymer dispersions are conventionally stabilised using known emulsifiers or protective colloids which are known to the person skilled in the art (Houben-Weyl, Methoden der org. Chemie, Vol. XIV/1, 1961, Stuttgart). Examples of these are polyglycol ethers, sulphonated paraffin hydrocarbons, higher alkyl sulphates (such as, for example, lauryl sulphate), alkali metal salts of fatty acids, such as sodium stearate or sodium oleate, salts of sulphonated arylaromatics such as, for example, sodium dodecylbenzenesulphonate, ethoxylated $C_4$–$C_{12}$ alkylphenols and their sulphonation products and esters of sulphosuccinic acid. Examples of protective colloids are alkylhydroxyalkyl celluloses, partly or completely hydrolysed polyvinyl alcohols and copolymers of the same, acrylic acid, homopolymers and copolymers and partly neutralised salts of the same, acrylamide copolymers, polyacrylate copolymers and salts of the same, carboxyalkyl celluloses such as, for example, carboxymethyl celluloses and salts thereof, and water-soluble starch derivatives.

In this connection the polymer dispersions are often stabilised using the emulsifiers acting in combination with carboxyl groups which have been incorporated into the polymers. The stability of such systems to multivalent ions, for example, to calcium ions, is frequently unsatisfactory, particularly at elevated temperatures and under the action of shear forces. To overcome this disadvantage, in prior art monomers which bring about a so-called "steric stabilisation" through the incorporation of hydrophilic groups were often used concomitantly in the polymerisation. Acrylamide and/or methacrylamide may be mentioned as known monomers which bring about the emulsification and stabilisation of aqueous dispersions (DE-A 2 160 381 and DE-A 2 213 756). The stabilisation of the polymer dispersions to multivalent ions achieved here is good, but the monomers used for the purpose have some serious disadvantages (increased toxicity, increase in the viscosity of the dispersions with associated processing problems, problems of toxicity in the final dispersions owing to residues of monomeric acrylamide and/or methacrylamide). Ethoxylated alkylphenols and their sulphuric half-esters or sulphonation products, which have also been proposed as emulsifiers for achieving high stabilities to multivalent ions (see U.S. Pat. No. 5,252,128), are suspected of causing environmental damage. Mixtures of ionic and nonionic emulsifiers and protective colloids (see, for example, DE-A 42 06 429) likewise permit the preparation of dispersions having high stability to electrolytes but, being multicomponent mixtures, they are very expensive to produce. Moreover, the optimisation of these systems is complicated and therefore not very economic.

The object of the present invention was to provide aqueous polymer dispersions which do not have the above-mentioned disadvantages.

The present invention accordingly provides stable, aqueous dispersions of copolymers obtainable by emulsion polymerisation of a) from 20 to 80 parts by weight of conjugated aliphatic dienes, b) from 20 to 80 parts by weight of vinyl aromatic compounds, c) from 0.1 to 10 parts by weight of ethylenically unsaturated carboxylic acids and/or dicarboxylic acids, d) from 0 to 20 parts by weight of ethylenically unsaturated carboxylic acid nitrites and e) from 0 to 20 parts by weight of copolymerisable vinyl compounds differing from component b)

in the presence of water and of 0.1 to 5 parts by weight of emulsifiers, referred to 100 parts by weight of components a) to e), and in the presence of water-soluble initiators, the emulsifiers used being f) sulphuric acid half-esters of ethoxylated fatty acid alcohols and/or g) salts of esters and half-esters of alkylpolyoxyethylene sulphosuccinates, moreover with 15 to 85 wt. % of the total of the emulsifiers used being added within the time in which up to 40% of the overall conversion of the components used is attained, and with 1 to 50% of the carboxylic acid groups contained in component c) being neutralised by the addition of bases during the emulsion polymerisation.

The aqueous dispersions according to the invention are obtainable preferably by emulsion polymerisation of 25 to 65 parts by weight of component a), 25 to 65 parts by weight of component b), 1 to 6 parts by weight of component c), 0 to 15 parts by weight, in particular 0 to 10 parts by weight of component d) and 0 to 15 parts by weight, in particular 0 to 10 parts by weight of component e).

Preferred conjugated aliphatic dienes (component a)) are butadiene, isoprene, 1,3-pentadiene, dimethylbutadiene and/or cyclopentadiene. Vinyl aromatic compounds (component b)) to be mentioned in particular are styrene, α-methylstyrene and/or vinyltoluene. Ethylenically unsaturated carboxylic acids and/or dicarboxylic acids (component c)) preferably used are α,β-monoethylenically unsaturated mono- and dicarboxylic acids having 3 to 6 C atoms such as, for example, acrylic acid, methacrylic acid, maleic acid, fumaric acid, itaconic acid. Ethylenically unsaturated carboxylic acid nitriles preferably mentioned are acrylonitrile and/or methacrylonitrile (component d)), and preferably mentioned copolymerisable vinyl compounds (component e)) are esters of acrylic and/or methacrylic acid wherein the alkyl group contains 22 or fewer carbon atoms. Examples of these are methyl acrylate, methyl methacrylate, ethyl (meth)acrylate, isopropyl (meth)acrylate, butyl (meth)acrylate, 2-ethylhexyl (meth)acrylate, allyl esters of saturated monocarboxylic acids, vinyl esters, vinyl ethers, vinyl ketones, dialkyl esters of unsaturated dicarboxylic acids, vinyl acetate and/or vinylpyridine, vinyl chloride, vinylidene chloride.

According to the invention the emulsifiers are used preferably in quantities of from 0.2 to 4.5 parts by weight, referred to 100 parts by weight of the above-mentioned components a) to e). Suitable emulsifiers according to the invention are in particular sulphuric acid half-esters of ethoxylated fatty alcohols consisting of a straight-chain or branched alkyl group having 8 to 18 carbon atoms, which is bonded via an ether group to a poly- or oligoethylene oxide sequence and the end groups of which comprise a sulphate group. In this connection suitable poly- or oligoethylene oxide sequences are ethylene oxide oligomers having a degree of polymerisation of 2 to 30 ethylene oxide units, preferably 2 to 20 ethylene oxide units.

Fatty alcohol ether sulphates particularly preferably mentioned are those which contain as fatty alcohol a $C_8$–$C_{18}$ alkyl group, for example, caprylic alcohol, capric alcohol, lauryl alcohol, myristyl alcohol, stearyl alcohol, oleic alcohol or elaidic alcohol. Particularly preferred are lauryl oligoethylene oxysulphate, palmityl oligoethylene oxysulphate, stearyl oligoethylene oxysulphate or oleyl oligoethylene oxysulphate, the oligoethylenoxy sequence consisting particularly preferably of 4 to 18 ethylene oxide units.

The fatty alcohol used here can be either the pure starting compound or else the mixtures of homologous and isomeric alkyl groups frequently occurring in the case of the synthetic fatty alcohols, for example, a mixture of $C_{12}$ and $C_{13}$ fatty alcohols. Typically the degree of ethoxylation expresses only the average value of a dispersion. However, both have only a minor influence on the target properties of the dispersions according to the invention.

The free acid group of the sulphate group is usually neutralised as the ammonium salt or alkali metal salt, but the neutralisation can also be carried out during the polymerisation by means of the base added.

In addition, according to the invention esters or half-esters of alkylpolyoxyethylene sulphosuccinates can be used as emulsifiers. Here the sulphosuccinic acid is esterified singly or doubly with poly- or oligoethylene oxide having 2 to 30 ethylene oxide units, preferably 2 to 20 ethylene oxide units, in particular 2 to 10 ethylene oxide units, the end group of the above-mentioned esters and half-esters comprising an alkyl group having 8 to 18 carbon atoms which is straight-chain or branched. The following are mentioned in particular as alkyl groups containing $C_8$–$C_{18}$ carbon atoms: caprylic alcohol, capric alcohol, lauryl alcohol, myristyl alcohol, stearyl alcohol or elaidic alcohol.

As mentioned above, in the course of the emulsion polymerisation it is conventional to add initiators to the polymerisation reaction. According to the invention water-soluble initiators are used, which are known for emulsion polymerisations and are common.

Examples mentioned in particular are organic and/or inorganic peroxides, such as alkali metal peroxydisulphates and/or azo compounds, or combined systems composed of at least one organic reducing agent and at least one peroxide and/or hydroperoxide such as, for example, tert. butyl hydroperoxide and the sodium salt of hydroxymethanesulphinic acid, or hydrogen peroxide and ascorbic acid, or combined systems containing in addition a small quantity of a metal compound which is soluble in the polymerisation medium and the metallic component of which can be present in several valence states, for example, ascorbic acid/iron(II) sulphate/hydrogen peroxide. In the latter example, the sodium metal salt of hydroxymethanesulphinic acid, sodium sulphite, sodium hydrogen sulphite and/or sodium metal disulphite are also frequently used instead of ascorbic acid, and tert. butyl hydroperoxide or alkali metal peroxydisulphates and/or ammonium peroxydisulphate instead of hydrogen peroxide. A combination of water-soluble Fe/V-salts is frequently used instead of a water-soluble iron(II) salt.

The initiator system, according to its consumption in the course of the radical aqueous emulsion polymerisation, may be added continuously or gradually. This depends in particular, in a known per se manner, both on the chemical nature of the initiator system and on the polymerisation temperature. Peroxides, for example, alkali metal peroxydisulphates such as sodium peroxydisulphate or ammonium peroxydisulphate are particularly preferred.

The most favourable quantity of water-soluble initiators can easily be determined by appropriate preliminary tests. Conventionally the water-soluble initiators are added in a quantity of from 0.1 to 2.0 wt. %, referred to the total mass of the monomers being polymerised.

Furthermore, the known molecular-weight controllers such as mercapto compounds, for example, tertiary dodecyl mercaptan or dimeric α-methylstyrene, can still be added for the emulsion polymerisation according to the invention. In addition still further auxiliary substances such as complexing agents, for instance, to control interfering metal ions, and inhibitors, for example hydroquinone monomethyl ether, can be added to the emulsion polymerisation. The molecular-weight controllers and the auxiliary substances are known and are described, for example, in Houben-Weyl, Methoden der organischen Chemie, Vol.XIV/1, page 297 ff., 1961, Stuttgart.

In the preparation of the aqueous dispersions according to the invention it is essential that from 15 to 85 wt. %, preferably 30 to 85 wt. %, of the total emulsifiers used are added to the reaction mixture within the time in which up to 40%, preferably 35%, of the overall conversion of the components used is attained. The conversion rate of the individual components can easily be established by determining the solids content of the dispersion by means of an evaporated sample.

In a special development of the emulsion polymerisation for the preparation of the aqueous dispersion of copolymers according to the invention, it can be of advantage at the very beginning of the polymerisation to add to the reaction mixture up to 15 wt. % of the total quantity of emulsifiers used and then to add the remaining quantity, that is, up to 75 wt. %, of the total quantity of emulsifiers used within the time in which up to 40% of the overall conversion of the components used is attained.

The rate of metering the emulsifiers during the emulsion polymerisation is also governed by the intended particle size of the final polymers and by the reaction rate and can easily be determined by several preliminary tests. Here the optimum is determined from a minimal quantity of deposits (coagulate) during the polymerisation, the achievement of the required final particle size and particle distribution and the maximum stability to multivalent ions of the resulting polymer dispersion.

The residual quantity of emulsifiers, that is, 85 to 15 wt. % of the total emulsifiers used, can be metered to the reaction mixture during the remaining period of polymerisation or added to the dispersion after completion of the polymerisation.

Also crucial to the target properties of the aqueous dispersion of copolymers is the neutralisation of the copolymerisable carboxylic acids and/or dicarboxylic acids (component c)) used in the polymerisation. Preferably 5 to 45% of the carboxylic acid groups contained in component c) are neutralised with bases.

Suitable bases are in particular aqueous solutions of alkali metal oxides or hydroxides, most preferably solutions of ammonium hydroxide, sodium hydroxide or potassium hydroxide.

Polymerisation pressure and polymerisation temperature are however of fairly minor importance. The reaction is generally carried out at temperatures of between 20° C. (room temperature) and 100° C., preferably at temperatures of 60° C. to 95° C.

After completion of the actual polymerisation process, stirring is preferably continued for several more hours with the polymerisation temperature being maintained. This can be followed by conventional steps for removing the residual monomers, for adjusting the pH value or by other methods for finally establishing particular properties.

In a particularly advantageous variant, the aqueous dispersions according to the invention are prepared as follows. Distilled water at approximately 85° C., chelating agent (for example, Trilon B from the firm BASF, Ludwigshafen), a portion of emulsifier and initiator and polymer seed latex (having an average particle size of approximately 35 nm, for example, based on styrene and acrylate) are placed in a polymerisation vessel and heated to about 85° C., with stirring. The polymerisation vessel is flushed with nitrogen and the inflows of monomers, emulsifiers, bases, initiators and molecular-weight controllers are started and maintained over the duration of the polymerisation. The reaction temperature is then maintained for approximately 1 to 4 hours. At this point the latex has a solids content of about 50%. The pH value is adjusted to 7.0 by means of ammonia.

The aqueous dispersions of copolymers according to the invention based on aliphatic, conjugated dienes and vinyl aromatic compounds have a solids content (proportion of polymer) preferably of from 40 to 65%, in particular from 45 to 60%.

The advantages of the aqueous dispersions according to the invention lie in the particular stability to multivalent metal ions. Moreover the emulsifiers used are readily biodegradable and the viscosities are low and therefore lead to advantages in the preparation and handling of the dispersions. The polymers obtained by the process according to the invention have a good resistance to discoloration. In addition, when the dispersion according to the invention was used as a binder for the manufacture of coated paper, significant advantages were found compared with the dispersions containing acrylamide and this is expressed in improved printing properties.

EXAMPLES

General instructions for preparation

All the quantities of the constituents given in the polymerisation recipes were in parts by weight, referred to a total of 100 parts of monomers used.

A mixture listed in Tables 1 to 10 under the item "Receiver" was prepared in a polymerisation vessel. Here the water and the basis latex were added at a temperature of 85° C. The seed latex, for example, based on styrene and acrylic acid, had a predetermined particle size of 35 nm. A solution of the initiator APS (ammonium persulphate) was prepared using a portion of the water from the receiver and was added as a final component to the mixture.

The internal temperature of the reaction vessel was then adjusted to 85° C., the stirrer was put into operation and the inflows listed in the Tables were started at the time indicated and the components listed were introduced within the period indicated.

After the inflows in the experiments in Examples 2 to 10 had all been introduced, stirring was continued for 1 hour at 85° C. Residual quantities of the monomers used were then removed by introducing steam and applying a vacuum.

After the polymer dispersion formed had cooled to room temperature, the pH value was adjusted to pH 7.0 with ammonia water and a solids content of 50% was established by adding water.

The following tests were carried out and are tabulated in the Examples.

1) Brookfield viscosity [mPa·s], in accordance with ISO 1652
2) Coagulate content in %, referred to the proportion of polymer, drying conditions corresponding to DIN 53563
3) Surface tension (surf. tens.) [mN/m]
4) Specific turbidity [l/gcm]
5) Visual assessment of the deposit formation in the polymerisation vessel
6) Assessment of the shear stability of the latex ("shear stab."), see description of method
7) Assessment of the stability of the latex to calcium ions ("Ca test"), see description of method Description of method of assessing shear stability 2 g of a 20% calcium chloride solution is added slowly, with stirring, to 40 g of latex having a solids concentration of exactly 48% and a pH of 7.0.

The mixture is stirred for 5 minutes at room temperature and then filtered through a 50$\mu$filter.

The filtrate is placed in the measuring chamber of a rotational viscometer (for example, Haake Rotovisko RV 20, equipped with measuring head 1500 and programmable temperature control).

A shear gradient corresponding to 10,000 s$^{-1}$ is then applied and the temperature is raised from room temperature to 70° C. at a rate of 1° C./min.

The temperature at which the coagulation of the mixture takes place is recorded in °C. as the test result.

Description of method of assessing calcium stability

A latex sample of pH value 7.0 is adjusted to a solids content of 0.05% by adding distilled water. 0.5 molar calcium chloride solution is added thereto and the mixture is then agitated for 4 hours on a mechanical shaker. The specific turbidity of the sample is then determined by means of a photometer at a wavelength of 700 mm and with a cell thickness of 10 mm.

The quantity of calcium ions which brings about an agglomeration of the dispersion, detectable by the increase in the specific turbidity compared with a blank sample, is determined by several measurements with the addition of different quantities of the calcium chloride solution.

The stability to calcium ions is expressed in mmol $CaCl_2$/l.

Example 1 shows a recipe for the preparation of a copolymer dispersion with the use of acrylamide, but without the claimed emulsifiers, which exhibits a high stability to multivalent ions (shear stability and Ca test).

Example 2 shows a recipe for the preparation of an SBR copolymer without the use of acrylamide and without the emulsifiers according to the invention. The end polymer obtained exhibits only a slight stability to calcium ions.

Examples 1 and 2 represent prior art and are not part of the invention.

Examples 3 and 4 illustrate the effect of neutralising the ethylenically unsaturated carboxylic acids (c) used when a fatty alcohol ether sulphate having a degree of ethoxylation of 2 (Example 3) or a degree of ethoxylation of 4 to 5 (Example 4) is employed. The neutralisation is expressed by the degree of neutralisation [%]:

$$\frac{[\epsilon_{acid}]}{[\epsilon_{base}]} \times 100$$

[$\epsilon_{acid}$]=equivalents of ethylenically unsaturated carboxylic acids (c) used and
[$\epsilon_{base}$]=equivalents of base used.

The stabilities to calcium ions of the dispersions obtained are unsatisfactory at 0% degree of neutralisation when either emulsion is used and do not attain the level of the dispersion in Example 1.

Surprisingly, the stability to calcium ions increases dramatically above a degree of neutralisation of 7.5%, in order then to fall sharply again above a degree of neutralisation of 25%.

The optimal stabilities are obtained here at a degree of neutralisation of 10% to 25% in Example 3 and of 10% to 15% in Example 4, and consequently the high stabilities of the dispersions in Example 1 are attained or surpassed.

In Example 5 the metering of the emulsifiers according to the invention is illustrated (15% to 85% within the time in which up to 40% of the overall conversion takes place).

In this Example, the fatty alcohol ether sulphate having a degree of ethoxylation of 8 to 9 was used, with a degree of neutralisation of 15%.

All the dispersions in Example 5 exhibit an improvement in the stability to calcium ions compared with Example 2. Surprisingly, however, the target level of stability of Example 1 was attained only in experiment nos. 14 to 16, in which more than 50% of the total quantity of emulsifiers used during the polymerisation was introduced during the completion of up to 40% of the overall conversion of the components used.

The optimum of the $Ca^{2+}$ion stability is attained when approximately 65% of the total quantity of emulsifiers used is added to the reaction batch during the completion of up to 40% of the final conversion.

Examples 6 and 7 illustrate the effect of the degree of ethoxylation of the fatty alcohol ether sulphate on the stability of the dispersion.

From Example 6 it is apparent that, with increasing degree of ethoxylation of the emulsifier, the stability of the dispersion to $Ca^{2+}$ions increases. Experiment 17, lacking ethoxy groups, exhibits an unsatisfactory stability; in experiments 18 and 19, at degrees of ethoxylation of from 3 to 5 stabilities to calcium ions are attained which correspond to the target level of Example 1. Here experiment 17 is only a control experiment and not part of the claims.

In experiment 20, where an emulsifier containing 50 EO units is used, a stability distinctly surpassing that of Comparative Example 1 is found, but this type of emulsifier is not suitable for the intended use described, owing to the high quantities of coagulates and the deviation of the particle size, expressed by the specific turbidity.

Similarly, in Example 7 the optimum of the target properties is found in the case of 9 EO units, increased deposits and increasing particle sizes again being found in the case of the higher degrees of ethoxylation of experiment 23.

Examples 8 and 9 illustrate, for two emulsifiers having different degrees of ethoxylation, the effect of different quantities of emulsifier on the stability of the final dispersions.

Experiments 24 to 31 verify that, as expected, the stability of the dispersions to $Ca^{2+}$ions increases with increasing quantity of emulsifier.

Surprisingly however, the optimised conditions for the process contained in the previous Examples bring about an improvement in the target properties which clearly exceeds those obtained by a simple increase in the quantity of emulsifiers used.

Example 10 illustrates the use of another type of emulsifier.

The resulting stabilities to multivalent ions attain the level of the target Example 1, but are to some extent lower than the results for the preferred alkyl ether sulphates.

Table of the emulsifiers used

| Emulsifier No. | Type |
|---|---|
| 1 | Sodium dodecylbenzenesulphonate |
| 2 | Sodium dodecylsulphate |
|  | Slphuric acid half-ester of ethoxylated $C_{12}$–$C_{14}$ fatty alcohols, Na salts: Degree of ethoxylation: |
| 3 | 2 |
| 4 | 3 |
| 5 | 4–5 |
| 6 | 8–9 |
| 7 | 16 |
| 8 | approx. 50 |
| 9 | Half-ester of a tetraethyleneoxy lauryl alcohol with sulphosuccinic acid, sodium salt |

Abbreviations:

APS ammonium persulphate

DDM dodecyl mercaptan surf. tens. surface tension deg. neutr. degree of neutralisation Example 1

| Experiment no. | 1 | Start (h) | Period (h) |
|---|---|---|---|
| Receiver |  |  |  |
| basis latex | 1.14 |  |  |
| water | 32.4 |  |  |
| Trilon B | 0.01 |  |  |
| emulsifier 1 | 0.1 |  |  |
| APS | 0.1 |  |  |
| Inflows |  |  |  |
| 1) styrene | 59.85 |  |  |
| butadiene | 33.0 |  |  |
| acrylic acid | 4.0 | 0 | 7 |
| 2) acrylamide | 2.0 |  |  |
| water | 21.1 | 1 h 15' | 6.5 |
| 3) water | 35.2 |  |  |
| NaOH | 0 |  |  |
| APS | 1.0 | 0 | 8 |
| 4) DDM | 1.3 | 0 | 7 |
| 5) emulsifier 1 | 0.2 |  |  |
| water | 11.3 | 15 min | 1 |

After the end of inflow 3, a solution of 0.3 parts ammonium persulphate in 6 parts water is added with stirring over a period of 5 hours.

|  | 1 |  |
|---|---|---|
| viscosity | 190 | [mPa -s] |
| coagulate | 0.14 | [%] |
| surf. tens. | 47 | [mN/m] |
| deposits in vessel | free |  |
| Ca test | >30 | [mmol/l] |
| shear stab. | 60 | [° C.] |
| spec. turbidity | 0.83 | [l/gcm] |

Example 2

| Experiment no. | 2 | Start (h) | Period (h) |
|---|---|---|---|
| *Receiver* | | | |
| basis latex | 1.2 | | |
| water | 40 | | |
| Trilon B | 0.01 | | |
| emulsifier 1 | 0.1 | | |
| APS | 0.1 | | |
| *Inflows* | | | |
| 1) styrene | 61.8 | | |
|    butadiene | 33.0 | | |
|    acrylic acid | 4.0 | 0 | 7 |
| 2) emulsifier 1 | 0.4 | | |
|    water | 48.6 | | |
|    NaOH | 0.33 | | |
|    APS | 1.2 | 0 | 8.5 |
| 3) DDM | 1.1 | 0 | 7 |
| 4) emulsifier 1 | 0.2 | | |
|    water | 11.4 | 15 min | 1 |
| *Properties* | | | |
| viscosity | 78 | | |
| coagulate | 0.11 | | |
| deposits in vessel | free | | |
| surf. tens. | 45 | | |
| Ca test | 2 | | |
| shear stab. | coag. | | |
| spec. | 0.85 | | |

Example 3

| Experiment no. | 3 | 4 | 5 | 6 | 7 | Start | Period |
|---|---|---|---|---|---|---|---|
| *Receiver* | | | | | | | |
| basis latex | 1.15 | 1.15 | 1.15 | 1.15 | 1.15 | | |
| water | 35 | 35 | 35 | 35 | 35 | | |
| Trilon B | 0.01 | 0.01 | 0.01 | 0.01 | 0.01 | | |
| emulsifier 3 | 0.05 | 0.05 | 0.05 | 0.05 | 0.05 | | |
| APS | 0.1 | 0.1 | 0.1 | 0.1 | 0.1 | | |
| *Inflows* | | | | | | | |
| 1) styrene | 61.85 | 61.85 | 61.85 | 61.85 | 61.85 | | |
|    butadiene | 33 | 33 | 33 | 33 | 33 | | |
|    acrylic acid | 4.0 | 4.0 | 4.0 | 4.0 | 4.0 | 0 | 9 |
| 2) emulsifier 3 | 0.6 | 0.6 | 0.6 | 0.6 | 0.6 | | |
|    water | 48.6 | 48.6 | 48.6 | 48.6 | 48.6 | 1 h 15' | 7.75 |
| 3) NaOH | 0 | 0.167 | 0.22 | 0.56 | 0.9 | | |
|    deg. neutr. | 0% | 7.5% | 10% | 25% | 41% | | |
|    APS | 1.2 | 1.2 | 1.2 | 1.2 | 1.2 | | |
|    water | 7.1 | 7.1 | 7.1 | 7.1 | 7.1 | 0 | 9 |
| 4) DDM | 1.3 | 1.3 | 1.3 | 1.3 | 1.3 | 0 | 9 |
| 5) emulsifier 3 | 0.3 | 0.3 | 0.3 | 0.3 | 0.3 | | |
|    water | 9.3 | 9.3 | 9.3 | 9.3 | 9.3 | 15 min | 1 |
| *Properties* | | | | | | | |
| Ca test | 15 | 24 | 28 | 20 | 14 | | |
| deposits in vessel | free | free | free | free | free | | |
| coagulate | 0.1 | 0.11 | 0.12 | 0.13 | 0.19 | | |
| spec. turbidity | 0.851 | 0.869 | 0.810 | 0.820 | 0.860 | | |
| shear stab. | coag.* | 47 | 50 | 62 | 52 | | |
| viscosity | 115 | 110 | 105 | 128 | 131 | | |
| surf. tens. | 41 | 41 | 40 | 41 | 43 | | |

*Total coagulation already occurs during the preparation of the experimental mixture

Example 4

| Experiment no. | 8 | 9 | 10 | 11 | 12 | Start | Period |
|---|---|---|---|---|---|---|---|
| *Receiver* | | | | | | | |
| basis latex | 1.15 | 1.15 | 1.15 | 1.15 | 1.15 | | |
| water | 35 | 35 | 35 | 35 | 35 | | |
| Trilon B | 0.01 | 0.01 | 0.01 | 0.01 | 0.01 | | |
| emulsifier 5 | 0.05 | 0.05 | 0.05 | 0.05 | 0.05 | | |
| APS | 0.1 | 0.1 | 0.1 | 0.1 | 0.1 | | |
| *Inflows* | | | | | | | |
| 1) styrene | 61.85 | 61.85 | 61.85 | 61.85 | 61.85 | | |
|    butadiene | 33 | 33 | 33 | 33 | 33 | | |
|    acrylic acid | 4.0 | 4.0 | 4.0 | 4.0 | 4.0 | 0 | 9 |
| 2) emulsifier 5 | 0.6 | 0.6 | 0.6 | 0.6 | 0.6 | | |
|    water | 48.6 | 48.6 | 48.6 | 48.6 | 48.6 | 1 h 15' | 7.75 |
| 3) NaOH | 0 | 0.167 | 0.22 | 0.34 | 0.56 | | |
|    deg. neutr. | 0% | 7.5% | 10% | 15% | 25% | | |
|    APS | 1.2 | 1.2 | 1.2 | 1.2 | 1.2 | | |
|    water | 7.1 | 7.1 | 7.1 | 7.1 | 7.1 | 0 | 9 |
| 4) DDM | 1.3 | 1.3 | 1.3 | 1.3 | 1.3 | 0 | 9 |
| 5) emulsifier 5 | 0.3 | 0.3 | 0.3 | 0.3 | 0.3 | | |
|    water | 9.3 | 9.3 | 9.3 | 9.3 | 9.3 | 15 min | 1 |
| *Properties* | | | | | | | |
| Ca test | 5 | 33 | 40 | 28 | 28 | | |
| deposits in vessel | free | free | free | free | free | | |
| coagulate | 0.38 | 0.15 | 0.08 | 0.12 | 0.41 | | |
| spec. turbidity | 0.977 | 0.882 | 0.814 | 0.850 | 0.988 | | |
| shear stab. | coag. | 52 | 60 | 66 | 63 | | |
| viscosity | 80 | 120 | 98 | 108 | 120 | | |
| surf. tens. | 42 | 41 | 43 | 40 | 43 | | |

Example 5

| Experiment no. | 13 | 14 | 15 | 16 | Start | Period |
|---|---|---|---|---|---|---|
| *Receiver* | | | | | | |
| basis latex | 1.2 | 1.2 | 1.2 | 1.2 | | |
| water | 33 | 33 | 33 | 33 | | |
| Trilon B | 0.01 | 0.01 | 0.01 | 0.01 | | |
| emulsifier 6 | 0.05 | 0.05 | 0.05 | 0.05 | | |
| APS | 0.1 | 0.1 | 0.1 | 0.1 | | |
| *Inflows* | | | | | | |
| 1) styrene | 61.8 | 61.8 | 61.8 | 61.8 | | |
|    butadiene | 33 | 33 | 33 | 33 | | |
|    acrylic acid | 4.0 | 4.0 | 4.0 | 4.0 | 0 | 7 |
| 2) emulsifier 6 | 0.6 | 0.5 | 0.4 | 0.25 | | |
|    water | 48.6 | 48.6 | 48.6 | 48.6 | 1 h 15' | 6.75 |
| 3) NaOH | 0.33 | 0.33 | 0.33 | 0.33 | | |
|    deg. neutr. | 15% | 15% | 15% | 15% | | |
|    APS | 1.2 | 1.2 | 1.2 | 1.2 | | |
|    water | 7.1 | 7.1 | 7.1 | 7.1 | 0 | 8 |
| 4) DDM | 1.1 | 1.1 | 1.1 | 1.1 | 0 | 7 |
| 5) emulsifier 6 | 0.1 | 0.2 | 0.3 | 0.45 | | |
|    water | 11.3 | 11.3 | 11.3 | 11.3 | 15 min | 1 |
| *Properties* | | | | | | |
| Ca test | 15 | 25 | 38 | 28 | | |
| deposits in vessel | free | free | free | free | | |
| coagulate | 0.22 | 0.11 | 0.12 | 0.12 | | |
| spec. turbidity | 0.845 | 0.827 | 0.832 | 0.85 | | |
| shear stab. | 45 | 53 | 57 | 52 | | |
| viscosity | 78 | 103 | 110 | 85 | | |
| surf. tens. | 44 | 43.6 | 44.6 | 45 | | |

Example 6

| Experiment no. | 17 | 18 | 19 | 20 | Start | Period |
|---|---|---|---|---|---|---|
| Emulsifier type | 2 | 3 | 5 | 8 | | |
| EO units | 0 | 2 | 4 | 50 | | |
| *Receiver* | | | | | | |
| basis latex | 1.15 | 1.15 | 1.15 | 1.15 | | |
| water | 35 | 35 | 35 | 35 | | |
| Trilon B | 0.01 | 0.01 | 0.01 | 0.01 | | |
| emulsifier | 0.05 | 0.05 | 0.05 | 0.05 | | |
| APS | 0.1 | 0.1 | 0.1 | 0.1 | | |
| *Inflows* | | | | | | |
| 1) styrene | 61.85 | 61.85 | 61.85 | 61.85 | | |
| butadiene | 33 | 33 | 33 | 33 | | |
| acrylic acid | 4.0 | 4.0 | 4.0 | 4.0 | 0 | 9 |
| 2) emulsifier | 0.6 | 0.6 | 0.6 | 0.6 | | |
| water | 48.6 | 48.6 | 48.6 | 48.6 | 1 h 15' | 7.75 |
| 3) NaOH | 0.225 | 0.225 | 0.225 | 0.225 | | |
| deg. neutr. | 10% | 10% | 10% | 10% | | |
| APS | 1.2 | 1.2 | 1.2 | 1.2 | | |
| water | 7.1 | 7.1 | 7.1 | 7.1 | 0 | 9 |
| 4) DDM | 1.3 | 1.3 | 1.3 | 1.3 | 0 | 9 |
| 5) emulsifier | 0.3 | 0.3 | 0.3 | 0.3 | | |
| water | 9.3 | 9.3 | 9.3 | 9.3 | 15 min | 1 |
| *Properties* | | | | | | |
| Ca test | 4 | 28 | 40 | 45 | | |
| deposits in vessel | free | free | free | deposits | | |
| coagulate | 0.08 | 0.12 | 0.08 | 3.0 | | |
| spec. turbidity | 0.835 | 0.810 | 0.814 | 0.967 | | |
| shear stab. | coag.* | 50 | 60 | 60 | | |
| viscosity | 138 | 105 | 98 | 108 | | |
| surf. tens. | 39 | 40 | 43 | 43 | | |

*Total coagulation already occurs during the preparation of the experimental mixture

Example 7

| Experiment no. | 21 | 22 | 23 | Start | Period |
|---|---|---|---|---|---|
| Emulsifier type | 4 | 6 | 7 | | |
| EO units | 3 | 9 | 16 | | |
| *Receiver* | | | | | |
| basis latex | 1.2 | 1.2 | 1.2 | | |
| water | 33 | 33 | 33 | | |
| Trilon B | 0.01 | 0.01 | 0.01 | | |
| emulsifier | 0.05 | 0.05 | 0.05 | | |
| APS | 0.1 | 0.1 | 0.1 | | |
| *Inflows* | | | | | |
| 1) styrene | 61.8 | 61.8 | 61.8 | | |
| butadiene | 33 | 33 | 33 | | |
| acrylic acid | 4.0 | 4.0 | 4.0 | 0 | 7 |
| 2) emulsifier | 0.4 | 0.4 | 0.4 | | |
| water | 48.6 | 48.6 | 48.6 | 1 h 15' | 6.75 |
| 3) NaOH | 0.33 | 0.33 | 0.33 | | |
| deg. neutr. | 15% | 15% | 15% | | |
| APS | 1.2 | 1.2 | 1.2 | | |
| water | 7.1 | 7.1 | 7.1 | 0 | 8 |
| 4) DDM | 1.1 | 1.1 | 1.1 | 0 | 7 |
| 5) emulsifier | 0.3 | 0.3 | 0.3 | | |
| water | 11.3 | 11.3 | 11.3 | 15 min | 1 |
| *Properties* | | | | | |
| Ca test | — | — | — | | |
| deposits in vessel | free | free | some deposits | | |
| coagulate | 0.1 | 0.12 | 1.2 | | |
| spec. turbidity | 0.841 | 0.832 | 0.941 | | |
| shear stab. | 47 | 57 | 60 | | |
| viscosity | 105 | 110 | 98 | | |
| surf. tens. | 45 | 44.6 | 46 | | |

Example 8

| Experiment no. | 24 | 25 | 26 | 27 | Start | Period |
|---|---|---|---|---|---|---|
| *Receiver* | | | | | | |
| basis latex | 1.2 | 1.2 | 1.2 | 1.2 | | |
| water | 40 | 40 | 40 | 40 | | |
| Trilon B | 0.01 | 0.01 | 0.01 | 0.01 | | |
| emulsifier 5 | 0.05 | 0.05 | 0.05 | 0.05 | | |
| APS | 0.1 | 0.1 | 0.1 | 0.1 | | |
| *Inflows* | | | | | | |
| 1) styrene | 61.8 | 61.8 | 61.8 | 61.8 | | |
| butadiene | 33 | 33 | 33 | 33 | | |
| acrylic acid | 4.0 | 4.0 | 4.0 | 4.0 | 0 | 7 |
| 2) emulsifier 5 | 0.2 | 0.4 | 0.6 | 0.85 | | |
| water | 48.6 | 48.6 | 48.6 | 48.6 | 1 h 15' | 6.75 |
| 3) NaOH | 0.33 | 0.33 | 0.33 | 0.33 | | |
| deg. neutr. | 15% | 15% | 15% | 15% | | |
| APS | 1.2 | 1.2 | 1.2 | 1.2 | | |
| water | 7.1 | 7.1 | 7.1 | 7.1 | 0 | 8 |
| 4) DDM | 1.1 | 1.1 | 1.1 | 1.1 | 0 | 7 |
| 5) emulsifier 5 | 0.3 | 0.3 | 0.3 | 0.3 | | |
| water | 4.3 | 4.3 | 4.3 | 4.3 | 15 min | 1 |
| *Properties* | | | | | | |
| deposits in vessel | free | free | free | free | | |
| coagulate | 0.14 | 0.19 | 0.14 | 0.11 | | |
| spec. turbidity | 0.86 | 0.862 | 0.85 | 0.816 | | |
| shear stab. | 44 | 52 | 61 | 65 | | |
| viscosity | 110 | 120 | 105 | 103 | | |
| surf. tens. | 44 | 44 | 41 | 39 | | |

Example 9

| Experiment no. | 28 | 29 | 30 | 31 | Start | Period |
|---|---|---|---|---|---|---|
| *Receiver* | | | | | | |
| basis latex | 1.2 | 1.2 | 1.2 | 1.2 | | |
| water | 33 | 33 | 33 | 33 | | |
| Trilon B | 0.01 | 0.01 | 0.01 | 0.01 | | |
| emulsifier 6 | 0.05 | 0.05 | 0.05 | 0.05 | | |
| APS | 0.1 | 0.1 | 0.1 | 0.1 | | |
| *Inflows* | | | | | | |
| 1) styrene | 61.8 | 61.8 | 61.8 | 61.8 | | |
| butadiene | 33 | 33 | 33 | 33 | | |
| acrylic acid | 4.0 | 4.0 | 4.0 | 4.0 | 0 | 7 |
| 2) emulsifier 6 | 0.40 | 0.60 | 0.85 | 1.00 | | |
| water | 48.6 | 48.6 | 48.6 | 48.6 | 1 h 15' | 6.75 |
| 3) NaOH | 0.33 | 0.33 | 0.33 | 0.33 | | |
| deg. neutr. | 15% | 15% | 15% | 15% | | |
| APS | 1.2 | 1.2 | 1.2 | 1.2 | | |
| water | 7.1 | 7.1 | 7.1 | 7.1 | 0 | 8 |
| 4) DDM | 1.1 | 1.1 | 1.1 | 1.1 | 0 | 7 |
| 5) emulsifier 6 | 0.3 | 0.3 | 0.3 | 0.3 | | |
| water | 11.3 | 11.3 | 11.3 | 11.3 | 15 min | 1 |
| *Properties* | | | | | | |
| deposits in vessel | free | free | free | free | | |
| coagulate | 0.12 | 0.11 | 0.1 | 0.19 | | |
| spec. turbidity | 0.832 | 0.827 | 0.815 | 0.831 | | |
| shear stab. | 57 | 56 | 57 | 66 | | |

-continued

| Experiment no. | 28 | 29 | 30 | 31 | Start | Period |
|---|---|---|---|---|---|---|
| viscosity | 110 | 103 | 95 | 105 | | |
| surf. tens. | 45 | 44 | 42 | 42 | | |

Example 10

| Experiment no. | 32 | Start | Period |
|---|---|---|---|
| Receiver | | | |
| basis latex | 1.15 | | |
| water | 35 | | |
| Trilon B | 0.01 | | |
| emulsifier 9 | 0.05 | | |
| APS | 0.1 | | |
| Inflows | | | |
| 1) styrene | 61.85 | | |
| butadiene | 33 | | |
| acrylic acid | 4.0 | 0 | 9 |
| 2) emulsifier 9 | 0.6 | | |
| water | 48.6 | 1 h 15' | 7.75 |
| 3) NaOH | 0.225 | | |
| deg. neutr. | 10% | | |
| APS | 1.2 | | |
| water | 7.1 | 0 | 9 |
| 4) DDM | 1.3 | 0 | 9 |
| 5) emulsifier 9 | 0.3 | | |
| water | 9.3 | 15 min | 1 |
| Properties | | | |
| Ca test | 24 | | |
| deposits | free | | |
| in vessel | | | |
| coagulate | 0.16 | | |
| spec. turbidity | 0.867 | | |
| shear stab. | 48 | | |
| viscosity | 113 | | |
| surf. tens. | 45 | | |

Determination of discoloration

A latex film (5 cm×5 cm, thickness approximately 2.5 mm) is stored in a drying oven at 100° C. and assessed visually after 2 hours, 4 hours, 8 hours and 16 hours contact time. The classification is made on a scale from 0 ("no discoloration", clear translucent film) to 10 ("strong discoloration", brown-black discoloured film).

To carry out the assessment, a film of the dispersion from experiment 19 was compared with a dispersion from experiment 1 as a reference sample. As is shown in the Table, the dispersion 19 according to the invention exhibits a good resistance to discoloration.

TABLE 1

| Time (h) | Experiment 1 | Experiment 19 |
|---|---|---|
| 0 | 1 | 1 |
| 2 | 3 | 2 |
| 4 | 5 | 3 |
| 8 | 7 | 5 |
| 16 | 8–9 | 6 |

To examine the suitability of the dispersion according to the invention for coating paper, two paper coating colours were prepared.

The first (A) contained 30 parts of Clay SPS (commercially available from English China Clay, Great Britain) and 70 parts of carbonate Omya 90 (commercially available from Plüss Staufer, Switzerland). The other formulation (B) contained 70 parts of Clay SPS and 30 parts of Omya 90. Both pigments were dispersed in a weakly alkaline medium together with 0.3 parts of carboxymethyl cellulose Finn Fix 30 (commercially available from Metsä Serla, Finland), then 11 parts (referred to 100 parts of pigment) of SBR dispersion were incorporated by mixing. The pH value was adjusted to 8.5 using NaOH. The resulting paper coating colours had a solids content of 67% and a viscosity of from 1100 to 1200 mPa -s (Brookfield Viscosimeter R.V.T. at 100 rev/min).

The two paper coating colours A and B were applied to an 80 g/m$^2$ wood-free base paper by means of a conventional blade coating technique. A dry application weight of 12 g/m$^2$ on one side was obtained. The coated paper was then finished by means of a calender (2-nip rolls) at a temperature of 90° C. and a pressure of 220 kN/m. The wet picking resistance and the ink repellency of the coated paper were examined by means of the test methods described below. The test for the examination of the wet picking resistance determines the strength of the coating of a wetted paper; the higher the measured result, the better is the strength of the coating structure. The ink repellency is the capacity of the paper to take up a printed ink in the wet condition; a high value is a target property of the coated paper.

Ink repellency:

The method measures the ink receptivity of a wetted paper. A standard printing machine is used for the determination. A standard ink Lorilleux L3810 and a wetting agent consisting of 10% isopropanol in deionised water are used for the printing process. For the test process, 5 μl of the wetting agent is added, directly in front of the printing roller, to the test strip of the paper sample placed in the test printing machine. The printing process is then started without delay. The test now proceeds in a way such that the paper strip with the drop of wetting agent passes through the printing apparatus in the start position. In the course of this the wetting agent is pushed in front of the printing roller, the surface whereof holds the Lorilleux test ink, and on the test strip there appears a wetted zone and a dry zone, which has not come into contact with the wetting agent. By this means two zones of different ink density are formed on the test strip, caused by the fact that the dry zones exhibit a better receptivity to the printing ink. The wetted zones exhibit firstly a decreased ink receptivity owing to the water content of the paper and secondly a decreased ink density owing to the so-called "picking" (the pulling off by the viscous printing ink of coating structures weakened by the water content).

The ink densities of the wetted and dry zones are then determined by means of a standard instrument for measuring ink density.

The ink receptivity is determined from the average ink density values of the two zones from the relation:

$$\frac{\text{ink density wet}}{\text{ink density dry}} \cdot 100 = \text{ink receptivity} [\%]$$

Wet picking:

The strength of the coating in a wetted paper is determined from the wet picking resistance. The test is carried out using a standard printing machine. Standard sample inks L3800 to L3810 from the firm Lorilleux and a wetting agent consisting of 10% isopropanol in deionised water are used for the printing process. The sample inks L3800 to L3810 used differ in their viscosity and owing to this exert different pulling forces on the coating of the test paper.

The test is carried out in a way such that a test strip of the paper sample is first of all coated with a thin film of water in the wetting unit of the test printing machine and then immediately passes through the printing apparatus. The printing process is begun using an ink of low viscosity (L3800) and then the entire procedure is repeated using inks of increasing viscosity, until picking of the sample paper, detectable on parts of the printed sample paper having a damaged layer of coating, is observed for the first time.

The result is recorded as the number of the ink being used when damage to the layer first occurred.

As Table 2 shows, the dispersions according to the invention produce very worthwhile properties in the coated paper. As shown, the use of the claimed emulsifiers in combination with the claimed processing conditions result in a surprisingly good combination of wet picking resistance and ink receptivity.

TABLE 2

| Description no. | 1* | 2* | 6 | 11 | 32 |
|---|---|---|---|---|---|
| Coating colour | A | A | A | A | A |
|  | B | B | B | B | B |
| Wet picking | 3805 | 3803 | 3805 | 3805 | 3804 |
| Lorilleux ink | 3803 | 3802 | 3803 | 3804 | 3803 |
| Ink repellency | 54 | 51 | 59 | 63 | 58 |
| (% ink receptivity) | 47 | 45 | 52 | 57 | 52 |

*Only for purposes of comparison, not part of the invention

We claim:

1. An emulsion polymerization process for producing stable, aqueous dispersions of copolymers, the process comprising:

combining in the presence of water and water-soluble initiators
   (a) conjugated aliphatic dienes, in an amount of between about 20 and about 80 parts by weight,
   (b) vinyl aromatic compounds, in an amount of between about 20 and about 80 parts by weight,
   (c) ethylenically unsaturated carboxylic acids and/or dicarboxylic acids, in an amount of between about 0.1 and about 10 parts by weight,
   (d) ethylenically unsaturated carboxylic acid nitrites, in an amount of up to about 20 parts by weight,
   (e) copolymerizable vinyl compounds, different from component (b), in an amount of up to about 20 parts by weight,
   (f) base, in an amount sufficient to neutralize between about 1% and about 50% of carboxylic acid groups from component (c), and
   (g) emulsifier, in an amount of between about 0.1 and about 5 parts by weight per 100 parts by weight of the sum of components (a) to (e), the emulsifier comprising at least one component selected from the group consisting of (i) sulphuric acid half-esters of ethoxylated fatty acid alcohols, (ii) esters of alkylpolyoxyethylene sulphosuccinates, (iii) half-esters of alkylpolyoxyethylene sulphosuccinates, (iv) salts of esters of alkylpolyoxyethylene sulphosuccinates, and (v) salts of half esters of alkylpolyoxyethylene sulphosuccinates, wherein between about 15 and about 85 weight percent of the emulsifer is added within the time required to obtain about 40% overall conversion of monomeric components (a) to (e).

2. The process of claim 1, wherein each of components (i)–(v) contains an ethylene oxide oligomer having a degree of polymerization of between 2 and about 30 ethylene oxide units.

3. The process of claim 1, wherein the amount of emulsifier is between about 0.2 and about 4.5 parts by weight per 100 parts by weight of the sum of components (a) to (e).

4. The process of claim 1, wherein the water-soluble initiators are present in an amount of between about 0.1 and about 2 weight percent of the sum of components (a) to (e).

5. The process of claim 1, wherein the water-soluble initiators comprise at least one compound selected from the group consisting of organic peroxides, inorganic peroxides, and azo compounds.

6. The process of claim 1, wherein between about 30 to about 85 weight percent of the emulsifer is added within the time required to obtain about 40% overall conversion of monomeric components (a) to (e).

7. The process of claim 1, wherein the amount of base used is an amount sufficient to neutralize between about 5% and about 45% of carboxylic acid groups from component (c).

* * * * *